Aug. 16, 1966    G. L. TURNER    3,266,731
VACUUM MOTOR OPERATED SPRINKLERS AND THE LIKE
Filed July 6, 1964    5 Sheets-Sheet 1

INVENTOR.
GEORGE L. TURNER
BY Roy A. Plant
ATTORNEY

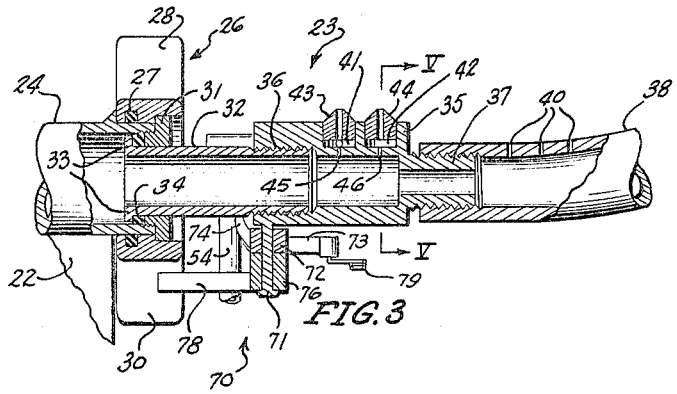
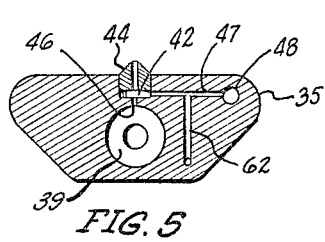
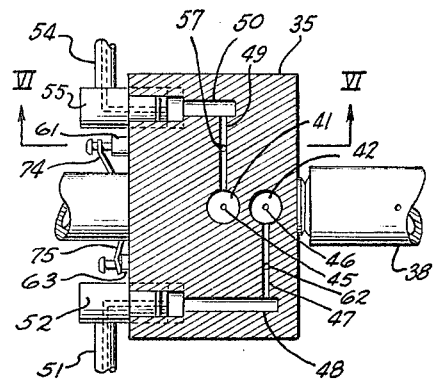
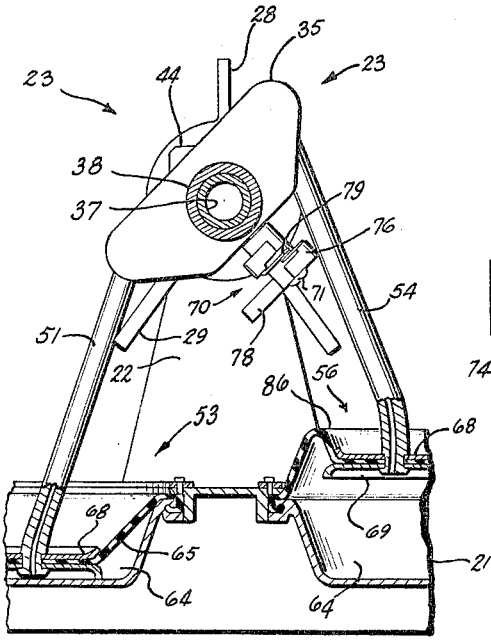
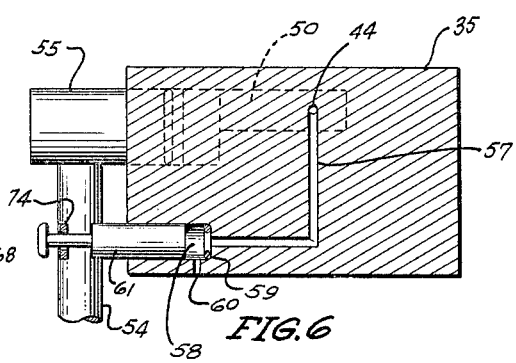

INVENTOR.
GEORGE L. TURNER
BY Roy A. Plant
ATTORNEY

Aug. 16, 1966  G. L. TURNER  3,266,731
VACUUM MOTOR OPERATED SPRINKLERS AND THE LIKE
Filed July 6, 1964  5 Sheets-Sheet 4
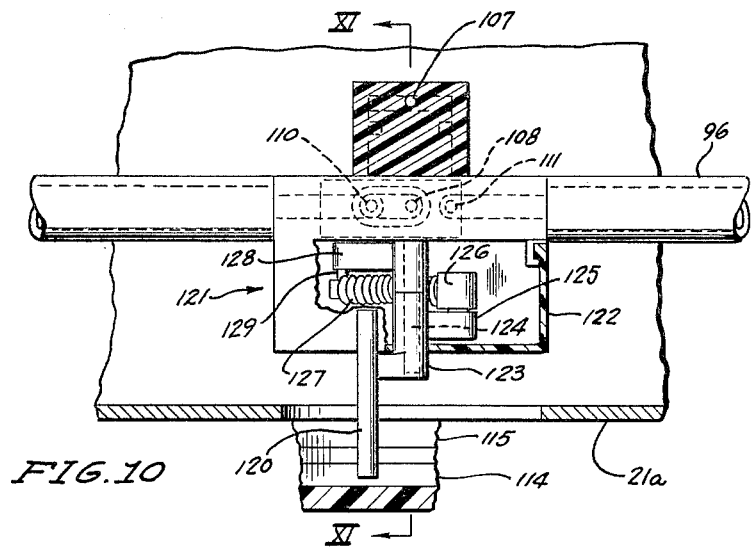
FIG.10
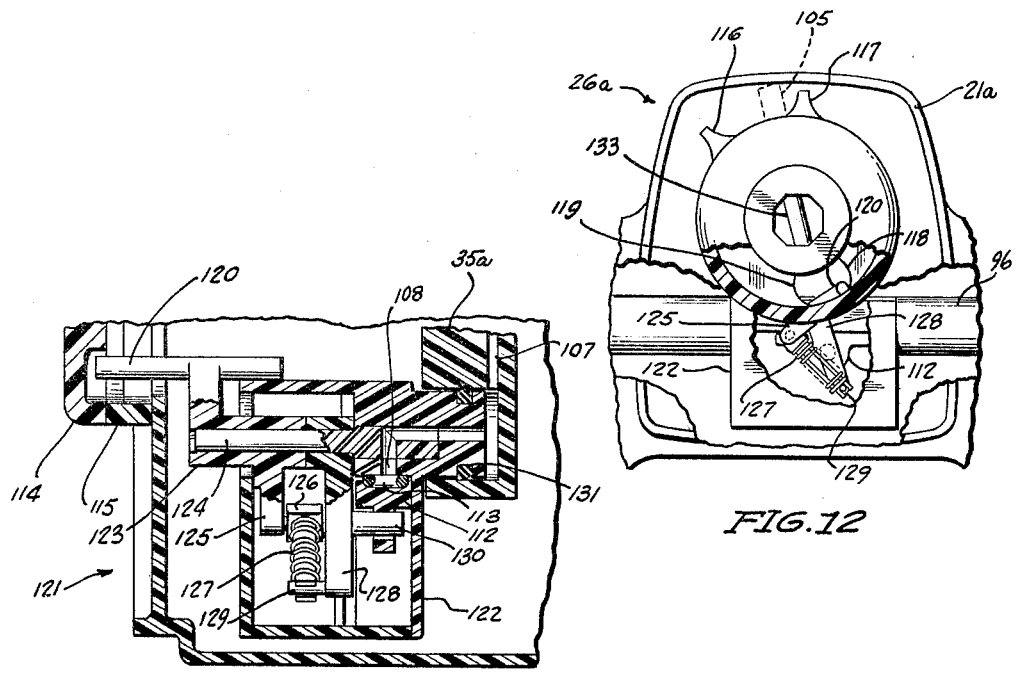
FIG.11
FIG.12
INVENTOR.
GEORGE L. TURNER
BY Roy A. Plant
ATTORNEY

United States Patent Office 3,266,731
Patented August 16, 1966

3,266,731
VACUUM MOTOR OPERATED SPRINKLERS
AND THE LIKE
George L. Turner, Hickory Corners, Mich., assignor to
H. B. Sherman Manufacturing Company, Battle Creek,
Mich., a corporation of Michigan
Filed July 6, 1964, Ser. No. 380,306
12 Claims. (Cl. 239—237)

The present invention relates broadly to vacuum operated motors, and in its more specific phases to vacuum motor operated wave type lawn sprinklers.

Wave type lawn sprinklers as originally constructed and as is still common commercial practice, utilize a direct water driven motor (all of the water passes through the motor on its way to the sprinkling outlets) to move the sprinkling outlet tube back and forth as it sprinkles the lawn area involved. These motors, however, tend to plug when foreign matter such as rust scales, pieces of grass, small stones or the like get into the end of the hose and are flushed through same into the sprinkler. All of these devices, moreover, have had the operating water which actuates the wave action motor then pass, at resultant lower pressure, through the sprinkler for delivery through the regular sprinkling outlets of the sprinkler. To overcome the shortcomings and difficulties due to such sprinkling pressure loss as well as that of plugging of the direct flow water driven motor there has been recently brought commercially onto the market my wave type lawn sprinkler, U.S. Patent No. 3,045,923, which has no direct water driven motor as such but which utilizes intermittent impact of the sprinkling stream of water on a pivoted member to gradually move the sprinkling outlet member for the production of the wave type delivery of sprinkling water. It was a recognition of the problems and difficulties involved in the wave type sprinkler art and the need of a different type of power drive than the direct water driven motor for such sprinklers which led to the conception and development of the present invention.

Accordingly, among the objects of the present invention is the provision of an improved type of power drive for wave type lawn sprinklers and the like which minimizes reduction of sprinkling water pressure at the sprinkler outlets and further eliminates the use of direct water driven motors and the plugging difficulties inherent in same.

Another object of the present invention is to provide a power drive for a wave type lawn sprinkler wherein the water which operates such power drive is not delivered with the general flow of sprinkling water through the same sprinkling openings, but rather is delivered from one or more sprinkling outlets independent of the outlets for the general flow of sprinkling water.

Another object of the present invention is to provide a wave type lawn sprinkler operated by a vacuum motor.

Another object of the present invention is to provide a wave type lawn sprinkler operated by a vacuum motor and which has an instantaneous reverse at each end of its crosswise travel which produces a more even sprinkling pattern than is possible with motor driven sprinklers which inherently dwell at each end of the sprinkling stroke.

A further object of the present invention is to utilize part of the water delivered to the wave type sprinkler for operating a vacuum type motor for actuating the sprinkler with such operating water passing out of one or more separate orifices and preferably in the same general discharge plane of main body of sprinkling water and supplementing same.

A further object of the present invention is to provide a lawn sprinkler of the wave type which has a higher outlet sprinkling pressure with greater sprinkling capacity than conventional sprinklers of the water motor operated type which pass all of the water through the motor on the way to the sprinkler outlets with resultant sprinkling outlet pressure loss.

A further object of the present invention is to provide a vacuum operated wave type lawn sprinkler wherein same has two vacuum motors alternately connected to a source of vacuum by a snap action suction shifting device.

Still further objects and advantages of the present invention will appear as the description proceeds.

To the accomplishment of the foregoing and related ends the invention, then, consists of the vacuum operated motor and sprinkler features hereinafter fully described and particularly pointed out in the claims, the annexed drawings and the following description setting forth in detail certain illustrative embodiments of the invention, such disclosed embodiments illustrating, however, but several of various ways in which the principle of the invention may be used.

In the annexed drawings:

FIGURE 3 shows a fragmentary longitudinal center section view as taken along line III—III of FIGURE 2, looking in the direction of the arrows.

FIGURE 4 shows a fragmentary partially sectioned view as taken along line IV—IV of FIGURE 2.

FIGURE 5 shows a sectional view as taken along line V—V of FIGURE 3, looking in the direction of the arrows.

FIGURE 6 shows an enlarged, fragmentary, partially sectioned view as taken along line VI—VI of FIGURE 4, looking in the direction of the arrows.

FIGURE 7 shows a fragmentary partially sectioned view similar to FIGURE 2 but with the sprinkling mechanism and vacuum motor tilted to reversing position at one extreme end of its operating range.

FIGURE 10 shows a fragmentary, partially sectioned view as taken at line X—X of FIGURE 9, looking in the direction of the arrows.

FIGURE 11 shows an enlarged, fragmentary, sectional view as taken along line XI—XI of FIGURE 10, looking in the direction of the arrows.

FIGURE 12 shows a fragmentary, partially sectioned view of the tripping mechanism and associated parts as they approach the tripping point where the wave sprinkler will instantaneously reverse its direction of sprinkling.

Figure 1:
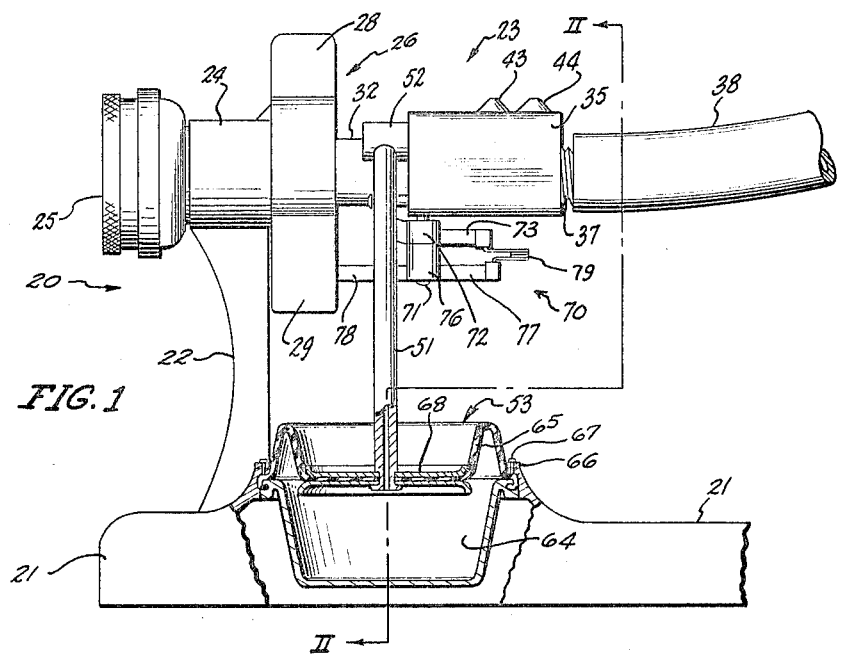
FIGURE 1 shows a fragmentary side elevational view of a portion of one form of the vacuum motor operated wave type sprinkler of the present invention.

Referring more particularly to FIGURES 1 to 7, inclusive, one form of the present invention involves a vacuum motor operated lawn sprinkler 20 having a base 21 and an upright support 22 for the sprinkler head assembly 23. The upper end of upright support 22 is provided with a tubular inlet member 24 carrying a conventional coupling nut 25 for threadly connecting to a water supply hose (not shown) in the usual manner. Rotatably mounted on the inner end of tubular inlet member 24, FIGURE 3, is a simple sprinkling direction controller 26 which utilizes an O-ring 27 to frictionally hold sprinkling direction controller 26 in various preset positions. This sprinkling direction controller 26, in the simple one piece form shown, preferably has an upward extending operating member 28 for use in rotatably adjusting same, and a pair of spaced apart lower sidewise projecting stop members 29 and 30, the use of which will be hereinafter explained. A shoulder stop member 31 conventionally fastened on the inner end of tubular inlet member 24, as by threading or the like, holds sprinkling direction controller 26 against endwise displacement.

Mounted on tubular inlet member 24 for rotation in the inner end of same is a connecting sleeve member 32 which has an outturned flange 33 with an O-ring 34 between same and shoulder stop member 31 to produce a water-tight seal for the water to be passed under pressure through the lawn sprinkler 20 under conditions of its operation. The other end of sleeve member 32 is fixedly connected to sprinkler body member 35, for instance by threads 36 as shown in FIGURE 3. An externally threaded male outlet nipple 37 connects body member 35 to a sprinkling tube 38 with its outlets 40 thus providing a straight through passageway 39 from tubular inlet member 24 to sprinkling tube 38 for the water to be dispensed by the lawn sprinkler 20.

Body member 35, FIGURE 3, between the inlet and outlet ends of same is provided with vacuum chambers 41 and 42 the tops of which, respectively, are closed with venturi nozzles 43 and 44 having central passageways preferably in the same plane as outlets 40 in sprinkling tube 38. Co-axial with the central passageways of venturi nozzles 43 and 44 are slightly smaller passageways 45 and 46 which extend respectively from passageway 39 into vacuum chambers 41 and 42. Water flowing from said passageway 39 under pressure through passageways 45 and 46 into and through vacuum chambers 41 and 42 and out through the outlet passageways in venturi nozzles 43 and 44 creates, in conventional manner, vacuum pressure in said vacuum chambers 41 and 42, which vacuum is used to operate vacuum motors for oscillating sprinkling tube 38 as will be hereinafter explained.

Referring more particularly to FIGURE 4, vacuum chamber 42 is connected by a passageway 47 to vacuum header 48 while vacuum chamber 41 is connected by a passageway 49 to a second vacuum header 50. A tubular leg member 51 with a hollow head 52 pivotally fitting the outer end of vacuum header 48, is connected at its lower end to vacuum motor 53 for operation as will be hereinafter explained. Likewise a second tubular leg member 54 with a hollow head 55 pivotally fitting the outer end of vacuum header 50, is connected at its lower end to a second vacuum motor 56.

To alternately operate vacuum motors 53 and 56, so as to oscillate sprinkling tube 38 back and forth, the vacuum to first one motor and then the other is broken and air allowed to flow into the vacuum motor where the vacuum has been broken while the other vacuum motor is actuated by the suction pressure applied to same. Referring now to FIGURES 4 and 6 it will be noted that there is connected to passageway 49 a branch passageway 57 which terminates in the inner end of a vacuum control compartment 58 with an O-ring 59 in said compartment and around the open end of branch passageway 57. A passageway 60 extends from compartment 58 adjacent O-ring 59 to the air for breaking the vacuum pressure to vacuum motor 56 when cylindrical valve 61 is moved away from O-ring 59 as shown in FIGURE 6. In like manner the operation of vacuum motor 53 is handled in the same way, the details of which, to avoid duplication, are not shown, and wherein a branch passageway 62 leads from passageway 47 to a vacuum control compartment having its O-ring (not shown), with a cylindrical valve 63, FIGURE 4, slidably fitting said last named vacuum control compartment with its air inlet vent (similar to 60 but not shown) to break the suction pressure exerted on vacuum motor 53. In FIGURE 4 the cylindrical valve 63 is in closed position, and cylindrical valve 61 is in open position.

Figure 2:
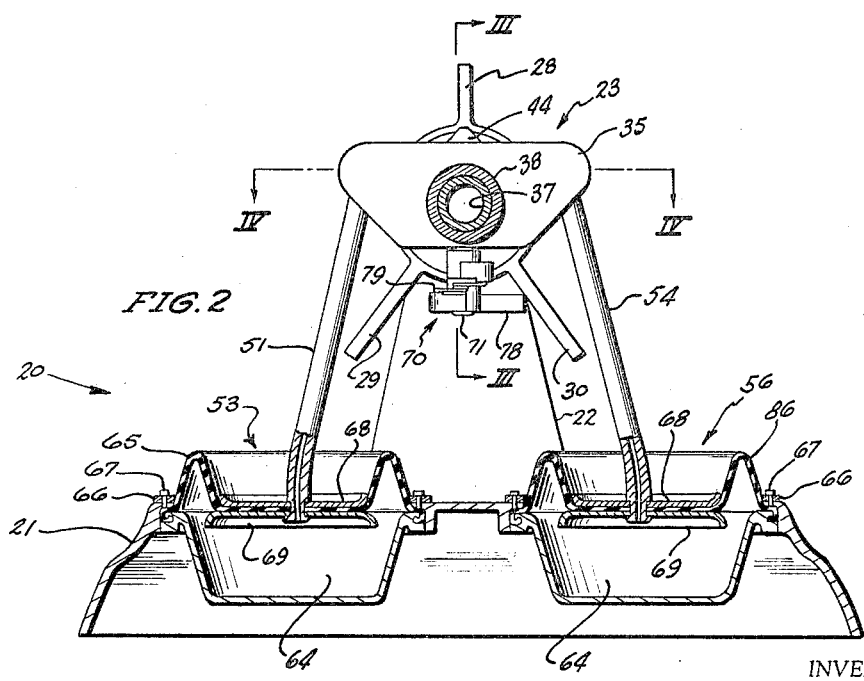
FIGURE 2 shows a partially sectioned fragmentary portion of one form of the wave type sprinkler of the present invention as taken at line II—II of FIGURE 1, looking in the direction of the arrows.

Referring more particularly to FIGURE 2 it will be noted that vacuum motor 53 has a compartment 64 the top of which is closed by a resilient and air-tight diaphragm 65 sealed in place to base 21 by a ring 66 and anchoring screws 67, while the center portion of diaphragm 65 is stiffened by upper and lower discs 68 and 69. Tubular leg member 51 is conventionally connected to discs 68 and 69 so as to form a vacuum connection into the inside of vacuum motor 53. It is thus to be seen that there is an open passageway from vacuum chamber 42 to the interior of vacuum motor 53, so that the making and breaking of the suction pressure exerted in compartment 64 is availed of to move diaphragm 65 down and up with consequent oscillating movement of body member 35 and sprinkling tube 38. Vacuum motor 56 and its connections to vacuum chamber 41 are identical with those of vacuum motor 53 and hence, to avoid duplication, detailed description of same is being omitted.

The mechanism which controls the oscillation of sprinkling tube 38 back and forth utilizes a reversing assembly 70, FIGURES 1, 2, 3 and 7. This assembly is mounted on a pivot pin 71 extending centrally down from the underside of body member 35. Pivotally mounted on pin 71 adjacent body member 35 is a vacuum breaker operating member 72 with a forward projecting arm 73 and two rearward projecting arms 74 and 75, the outer ends of which are slotted and operably engage the outer end of cylindrical valves 61 and 63, FIGURE 4, for moving same in or out of their respective vacuum control compartments. Since rearward projecting arms 74 and 75 operate in unison through the pivotal movement of vacuum breaker operating member 72, one of the cylindrical valves 61 or 63 is moved into vacuum sealing arrangement when the other is moved to vacuum breaking position exposing the corresponding vacuum breaking air passageway 60, FIGURE 6. Also pivotally mounted on pivot pin 71 is the actuating member 76 of reversing assembly 70. This actuating member 76 has a forward projecting arm 77 and a rearward projecting arm 78. The outer end of forward projecting arms 73 and 77 are connected by a snap action tension spring 79. Rearward projecting arm 78 extends between stop members 29 and 30 of sprinkling direction controller 26 so that as one of the vacuum motors 53 or 56 is rotating and changing the position of sprinkling tube 38 this brings the outer end of arm 78 up against one of the stop members 29 or 30 to start pivoting the actuating member 76 about pivot pin 71. When this pivoting reaches the point where the forward projecting arm 77 of actuating member 76 passes dead center of arm 73 tension spring 79 by snap action reverses the position of rearward projecting arm 78 to the opposite end of its travel while at the same time the vacuum breaker operating arm 72 swings the pair of arms 74 and 75 to reverse the position of cylindrical valves 61 and 63 to start the vacuum on one motor while breaking the vacuum on the other thus instantaneously reversing the direction of movement of oscillating sprinkling tube 38. Sprinkling direction controller 26, which is shown in center position for equal sprinkling on opposite sides of the sprinkler, can be shifted to one side or the other and frictionally held by O-ring 27 while thus limiting the sprinkling to one side or the other of the sprinkler. If desired this sprinkling direction controller 26 can be of the two piece construction shown in my U.S. Patent No. 3,045,923 so as to vary the width of the sprinkling pattern in addition to its position, and one form of same is shown in the modified form of sprinkler illustrated in FIGURES 8 to 16.

Figure 8:
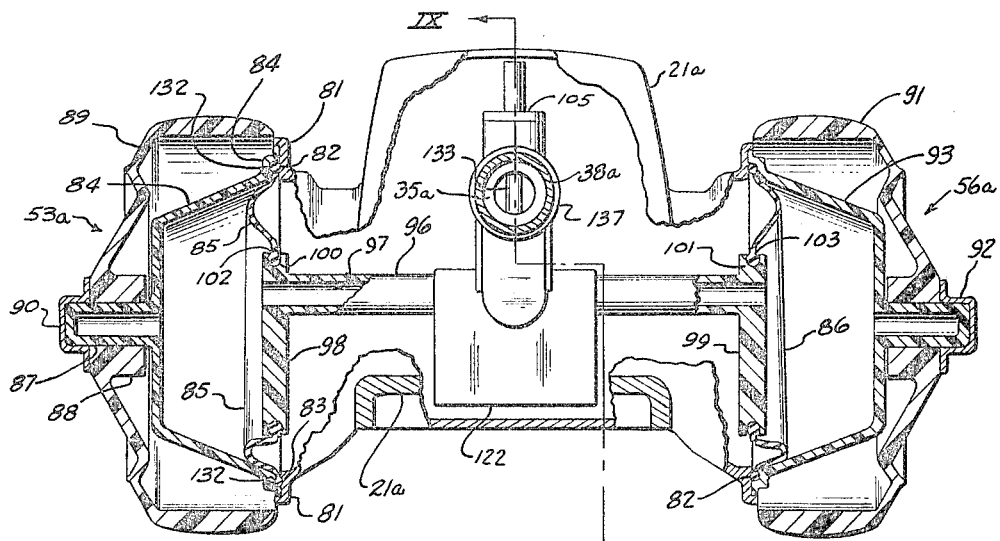
FIGURE 8 shows a fragmentary partially sectioned view of a modified form of the vacuum motor powered wave type sprinkler as taken at line VIII—VIII of FIGURE 9, looking in the direction of the arrows.
Figure 9:
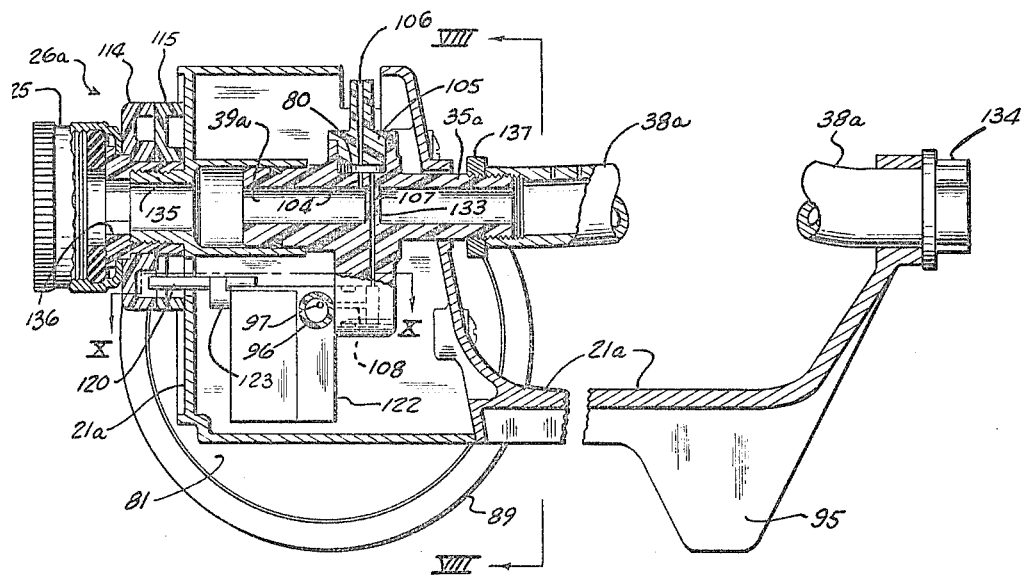
FIGURE 9 shows a fragmentary, longitudinal center section view as taken at line IX—IX of FIGURE 8, looking in the direction of the arrows.
Figure 13:
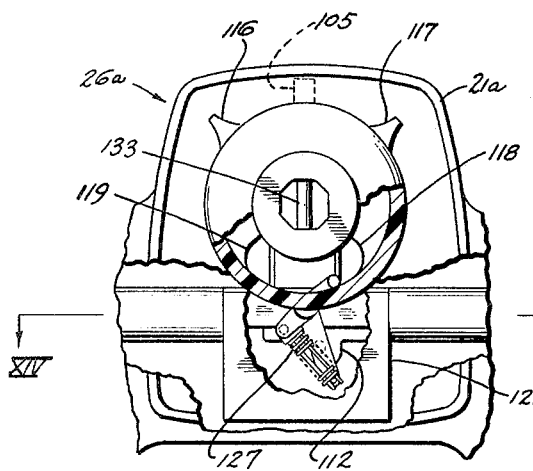
FIGURE 13 shows a fragmentary, partially sectioned view similar to FIGURE 12 and wherein the tripping mechanism has been set to trip at a different sidewise inclination of the outlets, with the direction of movement of the sprinkling member of the wave sprinkler the same as before.

A modified form of the vacuum motor operated sprinkler is shown in FIGURES 8 to 16, inclusive, wherein the sprinkler utilizes a single vacuum chamber 80, FIGURE 9, instead of the two vacuum chambers 41, 42 shown in FIGURE 3. Referring more particularly to FIGURES 8 and 9 it will be noted that the base 21a has a round outturned edge flange 81 at each end with the outer end face of same provided with a circumferential groove 82 adapted to have the side of the outer bead 83 of diaphragm 85 fit thereinto. A cover member 84 formed from a relatively rigid material such as sheet metal, hard rubber, relatively rigid plastic, or the like, firmly anchored by clamping or otherwise to the end of base 21a, is provided with a circumferential side groove 132 for receiving the opposite side of bead 83 of diaphragm 85 from that fitting circumferential groove 82 in the outer end of base 21a, so that the outer bead of diaphragm 85 is held firmly in air-tight manner. Coaxially of cover member 84 same is provided with an outwardly extending trunnion 87 adapted to rotatably fit the trunnion bearing 88 of wheel 89. A press fit flanged cap 90 tightly fits on the end of trunnion 87 to hold wheel 89 in place under conditions of use. Wheel 91 mounts on the opposite end of base 21a in the same manner as wheel 89 and is held in place by means of a flanged cap 92 the same as before described in connection with wheel 89. Also there is a cover member 93 and diaphragm 86 mounted in like manner within wheel 91. This wheeled construction facilitates relocation of the lawn sprinkler assembly, the other end of which may be conventionally provided with a skid 95, FIGURE 9.

Mounted within base 21a and extending generally centrally between diaphragm 85 and 86 is a diaphragm axle 96 FIGURE 8, which has a passageway 97 lengthwise of same. At the opposite ends of diaphragm axle 96 same is provided with radial discs 98 and 99 with each having a circumferential peripheral groove 100 and 101, respectively. Diaphragms 85 and 86 both have a center bead 102 and 103, respectively, to be stretched and placed into grooves 100 and 101 of radial discs 98 and 99, thus providing a closed compartment in each of the diaphragm cups 84 and 93, respectively, closed by said diaphragms 85 and 86, and with the only inlet and outlet to same being through the hollow diaphragm axle 96.

Referring now to FIGURE 9 it will be noted that there is a single vacuum chamber 80 having a small passageway 104 opening into passageway 39a through which water flows to sprinkling tube 38a. Closing the top of vacuum chamber 80 is a closure member or nozzle 105 having a venturi passageway 106 therethrough in line with passageway 104 and slightly larger at its inlet end than the outlet of said passageway 104 to assure free water flow thereinto and coaction with the walls of passageway 106 for creation of the desired vacuum. Flowing water under pressure through alined passageways 104 and 106 thus creates suction pressure in vacuum chamber 80 with the suction thus created being connected by means of passageway 107, in tube member 133, FIGURE 9, to center opening 108, FIGURES 14 and 16, for connection to first one of the diaphragm closed chambers and then the other for actuation of the assembly as will be hereinafter set forth.

Figure 14:
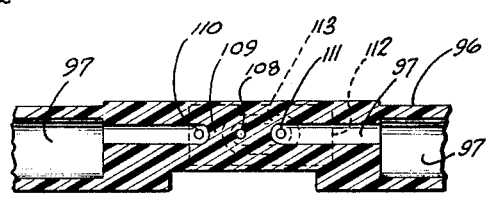
FIGURE 14 shows a fragmentary sectional view as taken at line XIV—XIV of FIGURE 13, looking in the direction of the arrows.
Figure 16:
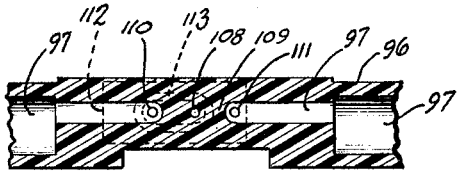
FIGURE 16 shows a fragmentary sectional view as taken at line XVI—XVI of FIGURE 15, looking in the direction of the arrows.
Figure 15:
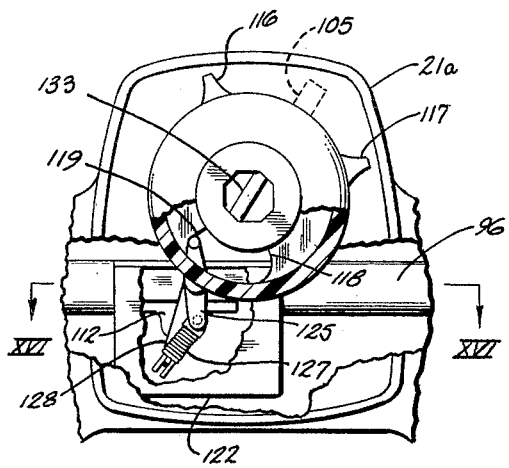
FIGURE 15 shows a fragmentary partially sectioned view similar to FIGURE 13 but with the tripping mechanism in its opposite tripped position and getting ready to trip again.

The diaphragm axle 96, as shown in FIGURES 14 and 16, has a longitudinal passageway 97 which has a stop portion 109 substantially midlength of same and with inlet openings 110 and 111 adjacent and substantially parallel to passageway 108 with both of said inlet openings 110 and 111 opening, respectively, into passageway 97 at opposite sides of said stop portion 109. Shiftably mounted over said portion of diaphragm axle 96 is a valve shoe 112, FIGURE 11, carrying a valve face member 113, preferably made of rubber so that as the shifting mechanism operates to move valve shoe 112 from one position to the other, this valve face member 113 will first lift slightly and then lower again for sealing when it shifts from one position where passageway 108 is connected to inlet passageway opening 111, FIGURE 14, to its other sealed position where passageway 108 is connected to inlet passageway opening 110, FIGURE 16, and in doing so will direct the suction pressure from passageway 108 to the other opening (110 or 111) for operating that particular connected vacuum motor 53a or 56a. This shifting of valve shoe 112 from one position to the other to connect either opening 110 or 111 to suction passageway 108 uncovers and opens the other opening (110 or 111) not included in the connected pair and thus breaks the vacuum to the vacuum motor connected to the disconnected opening (110 or 111) thus reversing the direction of endwise movement of diaphragm axle 96 and with it the direction of movement of sprinkling tube 38a.

The sprinkling direction controller 26a, FIGURE 9, used on the modified sprinkler construction of FIGURES 8 to 16 is similar to that shown in my Patent No. 3,045,923, in that it has two frictionally held adjustable ring members 114 and 115 with upwardly extending adjusting members 116 and 117, respectively, the location of which will determine whether the sprinkling is of maximum width, a narrower width, centered, or at one side or the other of the sprinkler assembly. This is accomplished by grooving the lower face of adjustable ring members 114 and 115 with the ends 118 and 119, respectively, of these grooves forming a stop for a rearward projecting arm 120 of the reversing assembly 121. The reversing assembly 121 is preferably located in a housing member 122, having a removable cover portion, to protect same. This arm 120 has a forward projecting end for limiting the extent of movement of same by contacting the top of housing 122 at each end of its travel, and it also has a sidewise projecting pivoted bearing member 123 mounted on stub shaft 124 carried by diaphragm axle 96. The pivotally mounted bearing member 123 has a forward projecting arm 125 carrying on its outer end a pivoted mounting 126 for a compression spring 127.

Also pivotally mounted on stub shaft 124 is a second forward projecting arm 128, FIGURE 11, which carries on its outer end a pivotal mounting means 129 for the second end of compression spring 127. That arm 128 carries on its side opposite said spring a bearing shaft 130 on which is pivotally mounted valve shoe 112 with its face member 113 which is used to connect center opening 108 first to opening 110 and then 111, or vice versa, for delivering vacuum operating suction pressure to said vacuum motors 53a and 56a. It is thus to be seen that as the vacuum motor assemblies operate to move diaphragm axle 96 in one direction this brings rearward projecting arm 120 up against end 118 or 119 of the corresponding slots in adjustable ring members 114 or 115 of sprinkling direction controller 26a. As the diaphragm axle 96 continues to move this acts through the corresponding end 118 or 119 in the noted slots actuating arm 120 to move forward projecting arm 125 relative to a second forward projecting arm 128 until they pass dead center with each other. At this point compression spring 127, which has been compressed during this relative movement of arms 125 and 128, snaps forward projecting arm 128 to its opposite pivotal position, and during its movement it slightly lifts valve shoe 112 and moves it from the position shown in FIGURE 14 to that of FIGURE 16, or vice versa, and drops it down again for vacuum sealing and which instantly shifts the applied vacuum from one vacuum motor to the other, while uncovering and opening to the atmosphere the previously covered vacuum inlet opening to release the vacuum previously applied through same to its vacuum motor so that the diaphragm axle can then shift sidewise in the opposite direction as described. It should be noted that to facilitate assembly and disassembly of the lawn sprinkler, the outer end of sprinkling tube 38 or 38a is closed by a plug 134, FIGURE 9, with the end of the tube and plug preferably threaded to facilitate their joinder.

Base 21a, FIGURE 9, has an externally threaded projection 135 on which is threadedly connected shoulder member 136 to which is conventionally fastened coupling nut 25. Rotatably mounted on shoulder member 136 are adjustable ring members 114 and 115 the function of which has been described in connection with adjusting the operation of sprinkling tube 38a. A locking nut 137 is preferably used to lock sprinkling tube 38a on the end of body member 35a.

While but two forms of the invention have been shown and described, other forms, modifications and changes based upon the teachings of this application will readily occur to those skilled in the art, and thus it is intended that the invention is not to be considered as limited to the specific details shown and described, but rather to encompass all modifications and equivalents within the spirit and scope of the invention as above described and illustrated in the drawings. Directional terms such as "upward," "lower," "top," "up," "down," "underside," et cetera, have been used to simplify description of said sprinkler as illustrated, but same is not to be considered as limiting on the current invention since same will operate in other positions than in the upright position shown.

Other modes of applying the principle of my invention may be employed instead of those explained, change being made as regards the vacuum operated equipment herein disclosed, provided the features and combinations stated by any of the following claims or the equivalent of such stated features and combinations be employed.

I therefore particularly point out and distinctly claim as my invention:

1. A sprinkler, comprising a supporting base, an inlet means for delivering liquid under pressure into said sprinkler, a sprinkling outlet means, means for pivotally mounting said sprinkling outlet means for back and forth movement, means connecting said inlet means to said outlet means for fluid flow therethrough, a vacuum producing means utilizing a portion of said liquid under pressure to produce said vacuum by venturi action, means delivering said vacuum producing liquid through at least one outlet opening in same independent of the outlets of said sprinkling outlet means, a vacuum motor means, means mechanically connecting said vacuum motor means to said sprinkling outlet means for pivotally moving same back and forth, means connecting said vacuum producing means to said vacuum motor means for actuation of the latter, and reversing means actuated by movement of said sprinkling outlet means to operate after said sprinkling outlet means has been mechanically moved by said vacuum motor means through a predetermined spraying angle in either direction to then actuate said vacuum motor means to move said sprinkling outlet means in opposite direction.

2. A sprinkler of the type set forth in claim 1, wherein said sprinkler is a wave type lawn sprinkler, and said sprinkling outlet means is pivotally mounted substantially parallel to said base with said outlets delivering water in a general upward direction under conditions of operation.

3. A wave type sprinkler, comprising a supporting base, an inlet means for delivering water under pressure into said sprinkler, a sprinkling outlet means, means pivotally mounting and supporting said sprinkling outlet means, means connecting said inlet to said outlet for fluid flow therethrough, means including a venturi for producing vacuum and which utilizes a portion of said water under pressure to produce said vacuum by venturi action, means delivering said vacuum producing water through at least one outlet opening independent of the outlets of said sprinkling outlet means, a pair of vacuum motors, means for operably connecting each of said vacuum motors alternately to said vacuum producing means and then to atmosphere, means mechanically connecting said vacuum motors to said sprinkling outlet means for pivotally moving same, and reversing means which operates first one of said vacuum motors and then the other to move said sprinkling outlet means continuously back and forth in predetermined amount.

4. A wave type sprinkler, comprising a supporting base, an inlet means for delivering water under pressure into said sprinkler, a sprinkling outlet means, means pivotally mounting and supporting said sprinkling outlet means, means connecting said inlet to said outlet for fluid flow therethrough, means including a venturi for producing vacuum and which utilizes a portion of said water under pressure to produce said vacuum by venturi action, means delivering said vacuum producing water through at least one outlet opening independent of the outlets of said sprinkling outlet means, a pair of variable size vacuum compartments, means for operably connecting each of said compartments alternately to said vacuum producing means and then to atmosphere, means actuated by varying the size of said compartments and means mechanically connecting said last named means to said sprinkling outlet means for pivotally moving same, and reversing means which varies the size of first one of said compartments and then the other to move said sprinkling outlet means continuously back and forth in predetermined amount.

5. A sprinkler of the type set forth in claim 4, wherein said reversing means includes a snap action mechanism for instantaneously reversing the variation of compartment size, said snap action mechanism having a member actuated by movement of said sprinkling outlet means to trip said snap action mechanism at predetermined points to disconnect one of said vacuum compartments and open it to the atmosphere while connecting the other solely to said vacuum producing means to move said sprinkling outlet means in the oppositie direction.

6. A sprinkler of the type set forth in claim 4, wherein said water passing through said vacuum producing means is delivered to the atmosphere in at least one sprinkling stream which blends with the rest of the water which has passed direct to said pivotally mounted sprinkling outlet means and is being delivered therethrough to the atmosphere, and wherein said reversing means includes a snap action mechanism for instantaneously reversing the variation of compartment size, said snap action mechanism having a member actuated by movement of said sprinkling outlet means to trip said snap action mechanism at predetermined points to disconnect one of said vacuum compartments and open it to the atmosphere while connecting the other solely to said vacuum producing means to move said sprinkling outlet means in opposite direction.

7. In a vacuum operated back and forth spraying motion lawn sprinkler having an inlet for water under pressure, a water spraying outlet from said sprinkler, and means connecting said inlet to said outlet, the combination therewith of a venturi type vacuum producing means, means bypassing to said vacuum producing means a portion of said water flowing from said inlet to said outlet, and discharging said vacuum producing bypassed water direct to the atmosphere.

8. A sprinkler assembly having an inlet connection and a back and forth pivotally movable sprinkling outlet means with means operably connecting them, which includes means for producing vacuum, a pair of spaced apart vacuum operated motors each of which has its own separate diaphragm as part of same, and means alternately operating first one of said motors while opening the other to atmosphere and then operating the other in like manner, both of said motors being connected to said sprinkling outlet means for pivotally moving same back and forth.

9. In a vacuum operated lawn sprinkler having an oscillatable spraying outlet means, a pair of spaced apart vacuum operated motors each of which has its own separate diaphragm as part of same, means mechanically connecting said vacuum operated motors to said spraying outlet means in manner such that actuating only one of said motors while opening the other to the atmosphere will move said oscillatable spraying outlet means in one direction while solely actuating the other vacuum motor and opening the first to the atmosphere will move said spraying outlet means in the opposite direction, and means thus operably actuating first one of said vacuum motors and then the other at predetermined points in the oscillating movement of said spraying outlet means, whereby the latter is moved back and forth in a predetermined path.

10. In a vacuum operated sprinkler having a pivotally mounted oscillatable spraying outlet means, means for producing a vacuum, and a pair of separate spaced apart vacuum operated diaphragm type motors connected to said spraying outlet means for moving same first in one direction and then the other, the combination therewith of a snap action mechanism, means for tripping said snap action mechanism when said spraying outlet means has pivotally moved a predetermined amount in either direction, and means actuated by said snap action mechanism, when tripped, to break the vacuum connection to the vacuum operated diaphragm type motor initially moving said spraying outlet means and to connect said vacuum to the other vacuum operated diaphragm type motor so that the latter will then move said spraying outlet means in the opposite direction.

11. A wave type lawn sprinkler, comprising a supporting base, an inlet means for delivering water under pressure into said sprinkler, a sprinkling outlet means, means pivotally mounting and supporting said sprinkling outlet means, means connecting said inlet to said outlet for fluid flow therethrough, at least one venturi including vacuum producing means, a pair of vacuum operated motors, means for operably connecting said vacuum producing means to said vacuum operated motors in manner alternately connecting one while opening the other to the atmosphere, means mechanically connecting said vacuum operated motors to said sprinkling outlet means for pivotally moving same back and forth, means controlling the range of movement of said sprinkling outlet means, instantaneously reversing means which actuates said means operably connecting said vacuum producing means to said vacuum operated motors so as to operate first one of said vacuum operated motors and then the other to move said sprinkling outlet means continuously back and forth in predetermined amount, and means bypassing part of the fluid received from said inlet means and passing same through said at least one venturi including vacuum producing means to produce said vacuum, and delivering same to the atmosphere independently of said sprinkling outlet means but in a substantially common plane with same.

12. A wave type lawn sprinkler as set forth in claim 11, wherein there are two of said venturis including vacuum producing means, and means connecting one of said vacuum producing means independently to one of said vacuum operated motors and the other vacuum producing means independently to the other of said vacuum operated motors, said instantaneous reversing means operably shifting said means for operably connecting said vacuum producing means to said vacuum operated motors as set forth so as to operate first one of said vacuum operated motors and then the other to move said sprinkling outlet means back and forth over a predetermined operating range.

References Cited by the Examiner

UNITED STATES PATENTS

| | | | |
|---|---|---|---|
| 2,426,603 | 9/1947 | Freygang | 239—239 |
| 2,597,366 | 5/1952 | Nordenstam | 239—239 |
| 2,942,789 | 6/1960 | Smith | 239—239 |
| 2,993,649 | 7/1961 | Holy | 239—237 |
| 3,045,923 | 7/1962 | Turner | 239—230 |

FOREIGN PATENTS 188,956   3/1957   Austria.

M. HENSON WOOD, Jr., *Primary Examiner.*

V. C. WILKS, *Assistant Examiner.*